Jan. 1, 1935.　　　　F. W. HEHRE　　　　1,986,635
TOY ELECTRIC RAILWAY APPARATUS
Filed Nov. 12, 1930　　2 Sheets-Sheet 1
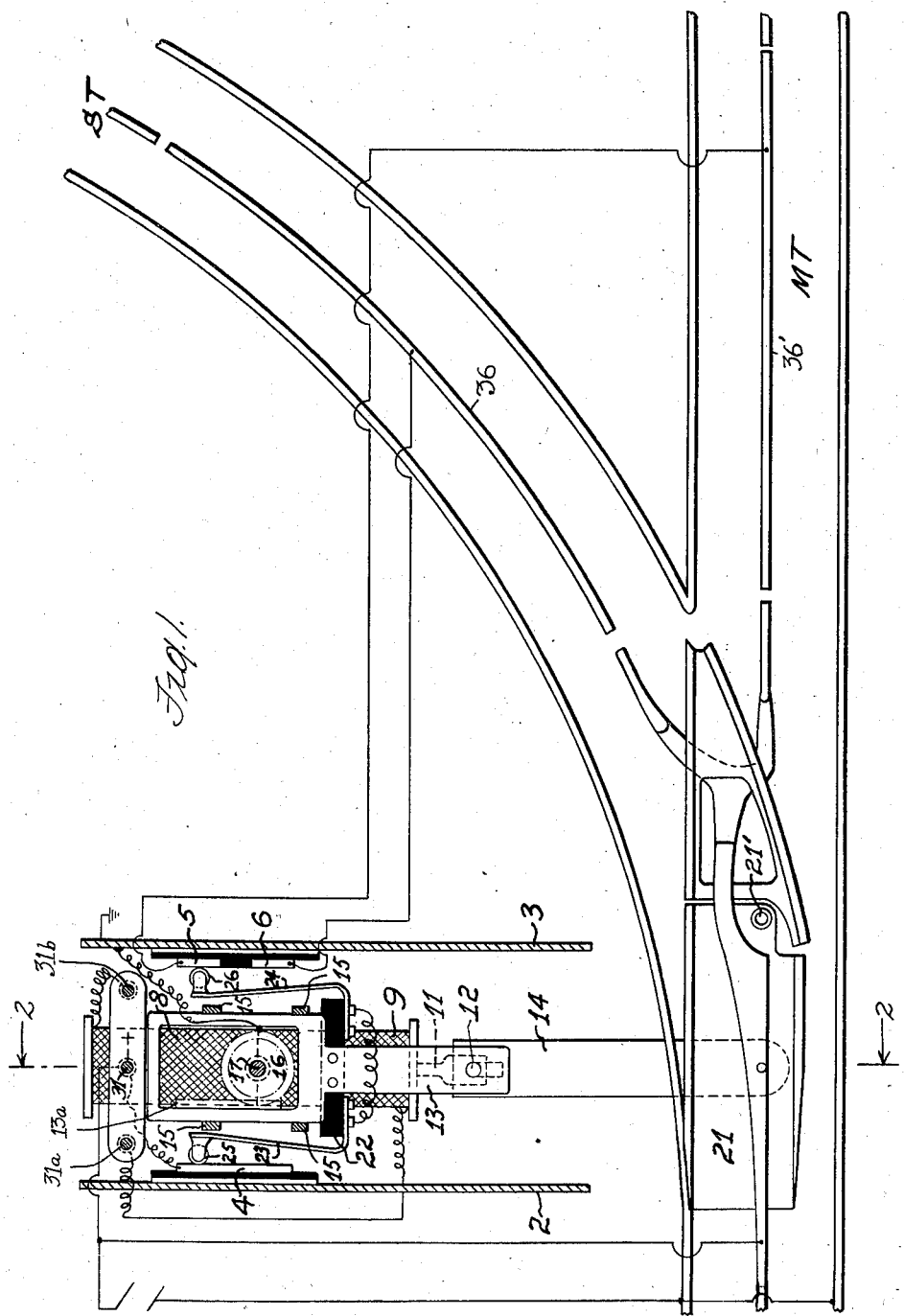

Jan. 1, 1935.  F. W. HEHRE  1,986,635
TOY ELECTRIC RAILWAY APPARATUS
Filed Nov. 12, 1930  2 Sheets-Sheet 2
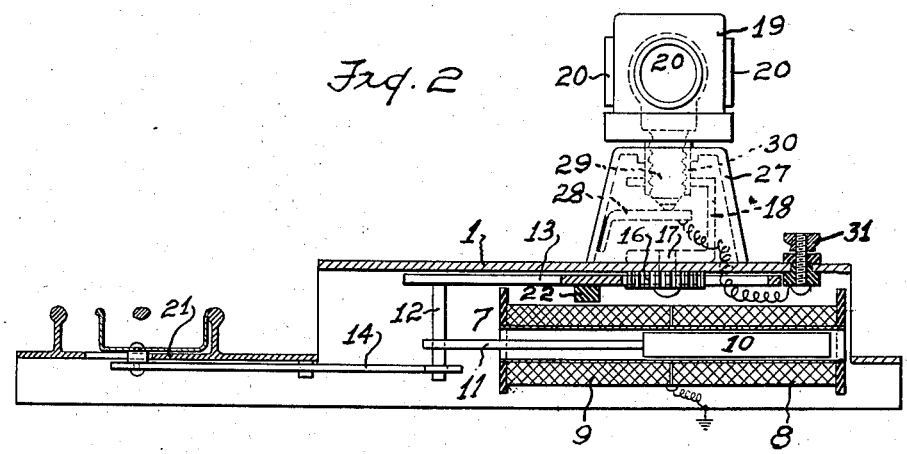
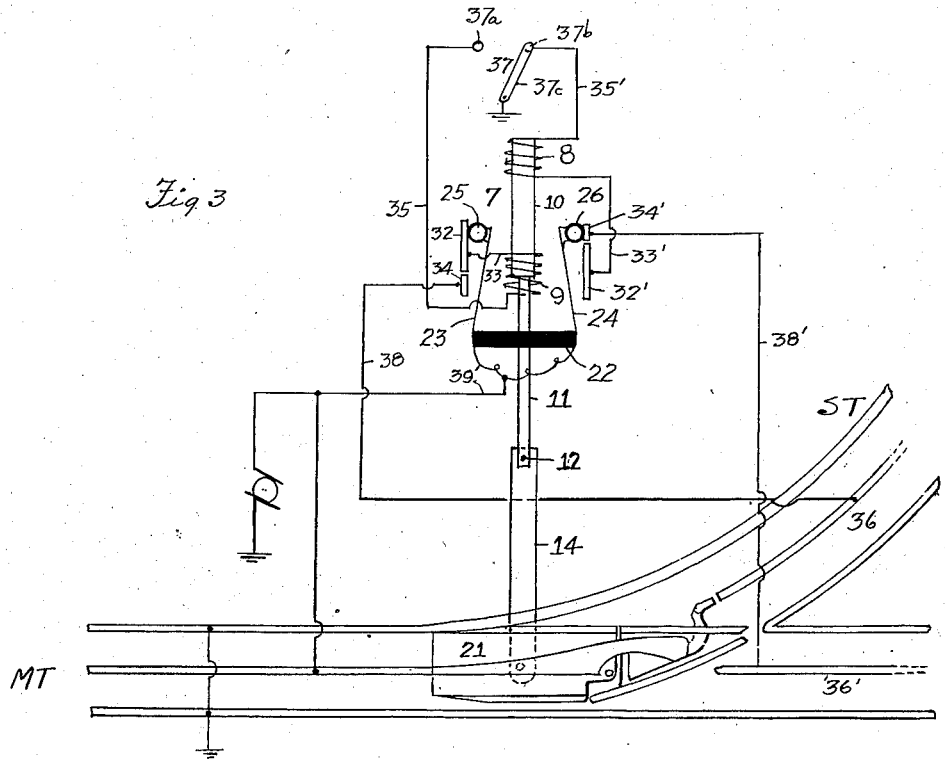
INVENTOR
Frederick W. Hehre
BY
ATTORNEY Patented Jan. 1, 1935

1,986,635

UNITED STATES PATENT OFFICE 1,986,635

TOY ELECTRIC RAILWAY APPARATUS

Frederick W. Hehre, Arlington, N. J., assignor to Leon W. Rosenthal, New York, N. Y.

Application November 12, 1930, Serial No. 495,015

1 Claim. (Cl. 246—31)

This invention relates to power devices for operating toy electric railway track and way elements, such as track switches, semaphores, gates and the like.

One object of this invention is to combine with reciprocating solenoid-actuated plungers an electrical switch.

Another object is to provide an electrical switch which may be combined with plungers now in use without materially modifying the construction thereof.

Still another object is to provide an electrical switch which may not alone be combined with said plunger without requiring material modification or reconstruction thereof, but which may be housed in the same casing as that in which said plunger is housed.

Another object is to provide means for supporting, centering and balancing the plunger per se.

Another object is to combine an electrical switch with said plunger in such a way as to support, center and balance said plunger in said solenoid.

Another object is to provide a plunger-operated switch having practically no or a minimum frictional resistance to its operation.

It is also a general object of this invention to provide a combined reciprocating solenoid-actuated plunger and electrical switch which shall be quick and positive in action and be operable at a low voltage with low current consumption.

Other features and objects of this invention appear hereafter.

In the accompanying drawings, illustrating the preferred embodiment of the invention, Fig. 1 is a plan view, partly in section and partly diagrammatically, of a combined electrical switch and reciprocating solenoid-actuated plunger, a toy electric railway having a track switch, and mechanical and electrical connections therebetween; Fig. 2 is a section on the line 2—2 of Fig. 1; and Fig. 3 is an electrical and circuit diagram of the apparatus shown in Fig. 1.

Referring to Figs. 1 and 2, there is shown a casing comprising a cover plate 1 and side plates 2 and 3. Insulatively mounted on said side plates are contact strips 4, 5 and 6 respectively. In said casing is disposed a double-throw solenoid 7 consisting of coils 8 and 9 in which is disposed for reciprocating movement the plunger 10. The latter is provided with an extension 11 which is mechanically connected by a pin 12 to a rack element 13 lying over the solenoid and a push rod 14 connected to the track switch 21. The rack is disposed between guides 15, 15, and has a toothed or rack section 13a which meshes with a pinion 16 riveted at 17 to a rotatable bracket 18 upon which is mounted a lamp housing 19 having suitable green and red lenses 20. The track switch 21 is pivoted at 21' for reversible operation, but the push rod 14 may be connected instead to a semaphore, gate or other reversible track or way element of a toy electric railway.

Secured to the rack element 13 is a switch bridging device comprising an insulating strip 22 carrying conducting opposed spring arms 23 and 24 at the ends of which are rotatively mounted metal rollers 25 and 26 arranged to roll over contacts 4, 5 and 6. The insulated piece 22, the arms 23 and 24, rollers 25 and 26 and contacts 4, 5 and 6, comprise the electrical switch referred to herein.

The pin 12 is preferably rigid with the extension 11 and rack element 13, and since the electrical switch arms are rigid with said rack element and supported by and between the contacts 4, 5 and 6, it will be seen that the said electrical switch acts to support, center and balance the plunger as well as the rack. The spring arms 23 and 24 are, of course, set to urge the rollers 25 and 26 against the contacts 4, 5 and 6.

The bracket 18 is enclosed in a stationary housing 27 carrying an insulated contact 28 connected to the current source and furnishing current to a lamp 29 contacting therewith and inserted in a socket supported on the bracket 18.

The plunger, when thrown, operates through the pin 12, the push rod 14, the track switch 21, the rack and pinion 13, 16, the switch arms 23, 24, and the bracket and housing 18, 19. When thrown from the position shown in the figures to its opposite position, the plunger moves the track switch from the position shown to a position where a train is permitted to run from the main track into the shunt and vice versa, the housing 19 is rotated a quarter of a turn and the rollers 25, 26 are moved from engagement with contacts 4 and 5 to engagement with contacts 4 and 6.

In the embodiment of Fig. 1, contact 4 of the electrical switch is connected at all times to the current source, while contacts 5 and 6 are respectively connected to insulated sections 36 and 36' in the shunt and main tracks ST and MT respectively. The rest of the track is at all times connected to the source. The arms 23 and 24 are electrically connected by a suitable conductor, so that it will be apparent current will be distributed through said electrical switch either to contact 5 or 6 and consequently to either section 36 or 36', depending upon the position of said electrical switch, which in turn is of course dependent upon the position of the track switch, in this instance.

The track switch being set for a train to pass thereover back and forth on the main track and prohibitive to a train passing thereover from the main track to the shunt track and vice versa, it is arranged that section 36' in the main track is energized while section 36 in the shunt is de-energized for the purpose fully described in my copending applications Serial No. 366,590, filed May 28, 1929, and Serial No. 395,071, filed September 25, 1929.

When the track switch is reversed or reset for shunt track operation, then the electrical switch is moved so that section 36 is energized and section 36' deenergized, as fully explained in said copending applications.

Contact 28 of the lamp housing 27 is constantly connected to the source of current so as to provide current to the lamps at all times.

The casing is provided with suitable terminals 31, 31a and 31b for making the necessary connections.

Fig. 3 shows diagrammatically a slightly different arrangement of switch contacts. Here on one side of the casing there are provided two contacts 32 and 34, one long and the other short, while on the other side there are also two contacts 34' and 32', the one short and the other long; a short contact is mounted opposite a long contact and a long contact is mounted opposite a short contact. Long contact 32 is connected by conductor 33 to one end of coil 9 while the other end of said coil is connected by conductor 35 to contact 37a of a single-pole double-throw manually operated switch 37. Long contact 32' is connected by conductor 33' to one end of coil 8, while the other end of said coil is connected by conductor 35' to contact 37b of said manual switch 37. Short contact 34 is connected by conductor 38 to insulated section 36, while short contact 34' is connected by conductor 38' to insulated section 36'. The arms 23, 24 are constantly connected to the source of current by conductor 39. The blade 37c of switch 37 is grounded.

The position of the movable parts of the apparatus shown in Fig. 3 is the same as that shown in Fig. 1 and the mechanical operation is also similar. However, there is a virtue in the peculiar construction and arrangement of the electrical switch contacts 32, 32', 34 and 34' which is not inherent in those shown in Fig. 1, and one which assures a more reliable operation of the plunger.

It will be observed that the circuit through each of the coils is from a long contact to one of the contacts of the switch 37. The former contact being long the coil will be energized for a sufficient length of time to completely throw the plunger. It is immaterial whether the so-called short contacts are really short or long since they merely provide a resting place for the switch arms and a point of connection to the respective insulated sections. The short contacts are made short because there is no necessity for their being long.

The principle of the arrangement just described will be more clearly understood from a description of the operation of the apparatus disclosed in said Fig. 3.

It will first of all be observed that the track switch is set for main track operation and that accordingly section 36' is energized through electrical switch arm 24 (connected to the source of current), contact 34' and conductor 38', while section 36 in the shunt is deenergized, arm 23 (also connected to the source) being disconnected from contact 34 which connects with said section. Now, when the blade of switch 37 is thrown into engagement with contact 37a, a circuit is completed through coil 9, this circuit being from the source, through arm 23, roller 25, contact 32, conductor 33 and blade to ground. Current flows through said coil 9, energizing it and producing thereby a pull on the plunger which resets the switch for shunt operation and moves the arms 23, 24 from engaging with contacts 32, 34' to 34, 32'. Contact 32 is, as will be observed, relatively long so that the arm 23 will remain in engagement therewith for a relatively long period of time and supply current to said coil for a similar period, long enough to overcome the inertia of the plunger and throw it into its final opposite position. It will be observed that soon after the travel of the plunger from the position shown to the other position the arm 24 breaks contact with 34' so that section 36' is deprived of current, and that towards the end of the throw the arm 23 breaks contact with 32, automatically cutting off current from coil 9, and makes contact with 34, thereby supplying current to section 36. The blade being thrown to contact 37a, the circuit through coil 8 is broken so that when roller 26 engages contact 32' no current flows through said coil and will not until the blade is thrown to contact 37b, when, of course, coil 8 will become energized to reverse the throw of the plunger, set the track switch as shown, and switch current from section 36 to section 36'.

In practice it has been found that when each long contact extends for about two-thirds of the stroke, the parts are carried to their limiting positions without disconcerting rebound.

Having thus described my invention, what I claim is:

In a toy electric railway apparatus, a track section including an electromagnetically operated track switch, solenoid windings associated with said switch, means for energizing said windings, a movable armature adjacent said windings, said armature being mechanically connected to a movable element of said track switch, a movable contact element comprising an insulating bar having a spring contact arm positioned at each end thereof, said contact element secured to and overlying said armature, stationary contacts comprising a short and a long contact positioned to engage with each of said spring contact arms and arranged in such manner that one spring contact arm engages a long contact while the other spring contact arm engages a short contact, said short contacts each being electrically connected to a power rail in said track section, and said long contacts each being electrically connected to one of said solenoid windings, the length of the long contact being more than one-half of the movement of the movable element.

FREDERICK W. HEHRE.